(12) United States Patent
Hahm et al.

(10) Patent No.: US 8,565,287 B2
(45) Date of Patent: Oct. 22, 2013

(54) METHOD AND SYSTEM FOR PER-CELL INTERFERENCE ESTIMATION FOR INTERFERENCE SUPPRESSION

(75) Inventors: Mark Hahm, Hartland, WI (US); Wei Luo, Marlboro, NJ (US); Bin Liu, San Diego, CA (US); Jun Wu, San Diego, CA (US); Severine Catreux-Erceg, Cardiff, CA (US); Shuangquan Wang, Morganville, NJ (US)

(73) Assignee: Broadcom Corporation, Irvine, CA (US)

( * ) Notice: Subject to any disclaimer, the term of this patent is extended or adjusted under 35 U.S.C. 154(b) by 452 days.

(21) Appl. No.: 12/575,879

(22) Filed: Oct. 8, 2009

(65) Prior Publication Data

US 2011/0075708 A1 Mar. 31, 2011

Related U.S. Application Data

(60) Provisional application No. 61/246,797, filed on Sep. 29, 2009.

(51) Int. Cl.
*H04B 1/00* (2006.01)

(52) U.S. Cl.
USPC ........... 375/148; 375/130; 375/140; 375/144; 375/147; 375/316; 375/346; 375/348

(58) Field of Classification Search
USPC ......... 375/148, 130, 140, 144, 147, 316, 346, 375/348
See application file for complete search history.

(56) References Cited

U.S. PATENT DOCUMENTS

| 8,085,889 B1* | 12/2011 | Narayan et al. ............... 375/346 |
| 2007/0127434 A1* | 6/2007 | Heinle .......................... 370/350 |
| 2009/0129448 A1* | 5/2009 | Koslov et al. ................. 375/148 |

FOREIGN PATENT DOCUMENTS

WO WO 2009/019540 * 2/2009

* cited by examiner

*Primary Examiner* — Leila Malek
(74) *Attorney, Agent, or Firm* — Sterne, Kessler, Goldstein & Fox P.L.L.C.

(57) ABSTRACT

A wireless system may receive a plurality of multipath signals from a plurality of transmitters and allocate per-cell modules for generating an interference suppressed signal from the multipath signals. Data symbols may be sequentially processed in the received multipath signals utilizing the per-cell modules and subtracting the processed symbols from a residual buffer storing the received multipath signals. Desired information received from one or more of the transmitters may be recovered utilizing the interference suppressed signal. Timing of the data symbols may be correlated utilizing a cell chip combiner. The data symbols may be descrambled utilizing conjugated scrambling codes associated with one of the plurality of transmitters. Orthogonal variable spreading factor (OVSF) codes may be generated utilizing a Walsh transform on the data symbols. Power levels of the OVSF codes may be estimated and estimated signals may be generated based on the OVSF codes and the estimated power levels.

20 Claims, 9 Drawing Sheets

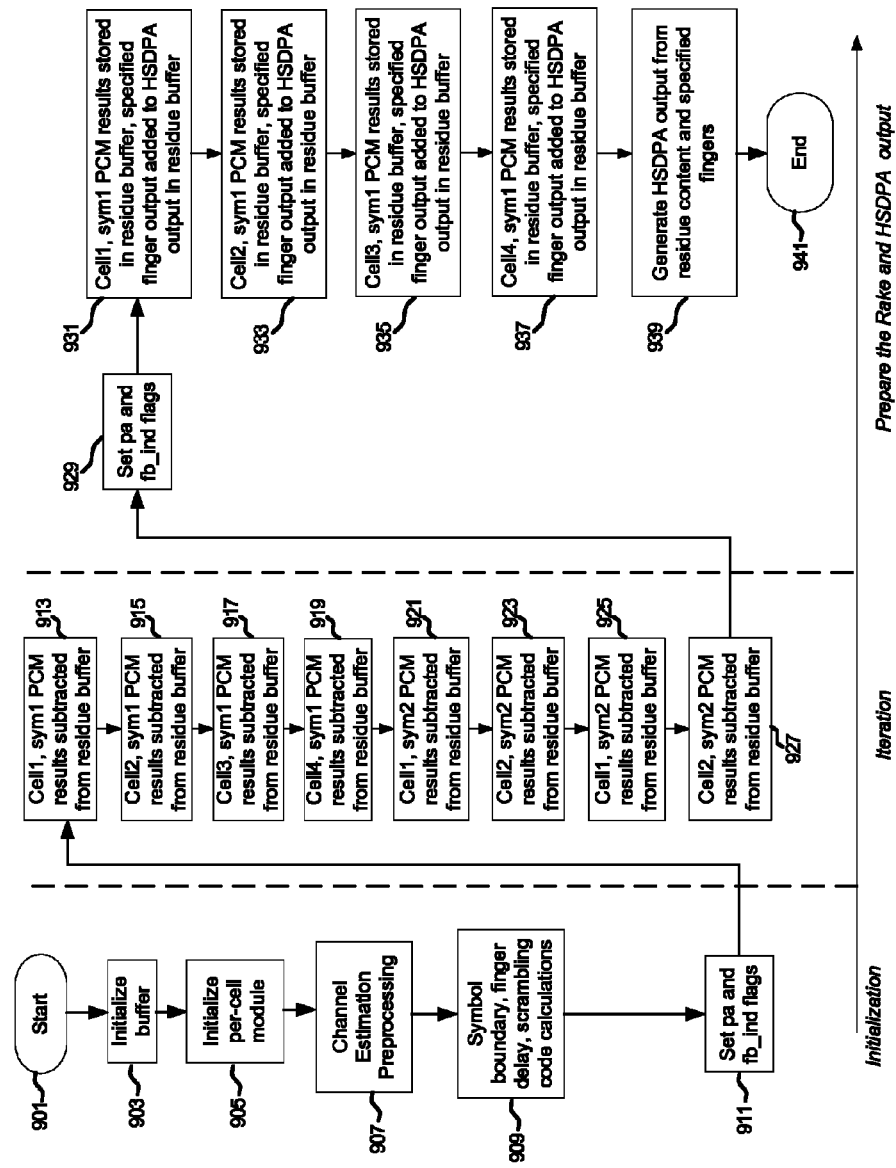

US 8,565,287 B2

METHOD AND SYSTEM FOR PER-CELL INTERFERENCE ESTIMATION FOR INTERFERENCE SUPPRESSION

CROSS-REFERENCE TO RELATED APPLICATIONS/INCORPORATION BY REFERENCE

This patent application makes reference to, claims priority to and claims benefit from U.S. Provisional Patent Application Ser. No. 61/246,797 filed on Sep. 29, 2009.

This application also makes reference to:
U.S. patent application Ser. No. 12/582,771, now U.S. Pat. No. 8,284,819, filed on Oct. 21, 2009;
U.S. patent application Ser. No. 12/604,978, now U.S. Pat. No. 8,498,324, filed on Oct. 23, 2009;
U.S. Patent Application Ser. No. 61/242,524, filed on Sep. 15, 2009;
U.S. patent application Ser. No. 12/573,803, now U.S. Pat. No. 8,311,484, filed on Oct. 5, 2009;
U.S. patent application Ser. No. 12/604,976, now U.S. Pat. No. 8,131,221, filed on Oct. 23, 2009;
U.S. patent application Ser. No. 12/611,810, now U.S. Pat. No. 8,503,588, filed on Nov. 3, 2009;
U.S. patent application Ser. No. 12/615,237, now U.S. Pat. No. 8,358,610, filed on Nov. 9, 2009;
U.S. Patent Application Ser. No. 61/288,008, filed on Dec. 18, 2009;
U.S. Patent Application Ser. No. 61/242,554, filed on Sep. 15, 2009;
U.S. patent application Ser. No. 12/612,272, now U.S. Pat. No. 8,369,384, filed on Nov. 4, 2009;
U.S. Patent Application Ser. No. 12/575,840, now U.S. Pat. No. 8,498,321, filed on Sep. 29, 2009;
U.S. patent application Ser. No. 12/605,000, now U.S. Pat. No. 8,509,287, filed on Oct. 23, 2009;
U.S. patent application Ser. No. 12/543,283, now U.S. Pat. No. 8,331,421, filed on Aug. 18, 2009;
U.S. patent application Ser. No. 12/570,736, filed on Sep. 30, 2009;
U.S. patent application Ser. No. 12/577,080, filed on Oct. 9, 2009; and
U.S. patent application Ser. No. 12/603,304, filed on Oct. 21, 2009.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for per-cell interference estimation for interference suppression.

BACKGROUND OF THE INVENTION

Wideband code division multiple access (WCDMA) is a third generation (3G) cellular technology that enables the concurrent transmission of a plurality of distinct digital signals via a common RF channel. WCDMA supports a range of communications services that include voice, high speed data and video communications. One such high speed data communications service, which is based on WCDMA technology, is the high speed downlink packet access (HSDPA) service.

WCDMA is a spread spectrum technology in which each digital signal is coded or "spread" across the RF channel bandwidth using a spreading code. Each of the bits in the coded digital signal is referred to as a "chip". A given base transceiver station (BTS), which concurrently transmits a plurality of distinct digital signals, may encode each of a plurality of distinct digital signals by utilizing a different spreading code for each distinct digital signal. At a typical BTS, each of these spreading codes is referred to as a Walsh code. The Walsh coded digital signal may in turn be scrambled by utilizing a pseudo normal (PN) bit sequence to generate chips. An example of a PN bit sequence is a Gold code. Each of a plurality of BTS within an RF coverage area may utilize a distinct PN bit sequence. Consequently, Walsh codes may be utilized to distinguish distinct digital signals concurrently transmitted from a given BTS via a common RF channel while PN bit sequences may be utilized to distinguish digital signals transmitted by distinct BTSs. The utilization of Walsh codes and PN sequences may increase RF frequency spectrum utilization by allowing a larger number of wireless communications to occur concurrently within a given RF frequency spectrum. Accordingly, a greater number of users may utilize mobile communication devices, such as mobile telephones, Smart phones and/or wireless computing devices, to communicate concurrently via wireless communication networks.

A user utilizing a first mobile communication device may be engaged in a communication session with a user utilizing a second mobile communication device via a first base transceiver station within a wireless communication network. For example, the second mobile communication device may transmit a digital signal to the first base transceiver station which may then transmit to the first mobile communication device. The first base transceiver station may encode signals received from the second mobile communication device and transmitted to the first mobile communication device by utilizing a Walsh code and a PN sequence. The first mobile communication device may receive signals transmitted concurrently by a plurality of base transceiver stations (BTSs) in addition to the first base transceiver station within a given RF coverage area. The first mobile communication device may process the received signals by utilizing a descrambling code that is based on the PN sequence and a despreading code that is based on the Walsh code. In doing so, the first mobile communication device may detect a highest relative signal energy level for signals received from the first base transceiver station, which comprise a digital signal corresponding to the second mobile communication device.

However, the first mobile communication device may also detect signal energy from the digital signals that correspond to signals from mobile communication devices other than the second mobile communication device. The other signal energy levels from each of these other mobile communication devices may be approximated by Gaussian white noise, but the aggregate noise signal energy level among the other mobile communication devices may increase in proportion to the number of other mobile communication devices whose signals are received at the first mobile communication device. This aggregate noise signal energy level may be referred to as multiple access interference (MAI). The MAI may result from signals transmitted by the first base transceiver station, which originate from signals received at the first base transceiver station from mobile communication devices other than the second mobile communication device. The MAI may also result from signals transmitted by the base transceiver stations BTSs other than the first base transceiver station. The MAI and other sources of noise signal energy may interfere with the ability of the first mobile communication device to successfully decode signals received from the second mobile communication device.

An additional source of noise signal energy may result from multipath interference. The digital signal energy corresponding to the second mobile communication device, which is transmitted by the first base transceiver station may disperse in a wavefront referred to as a multipath. Each of the components of the multipath may be referred to as a multipath signal. Each of the multipath signals may experience a different signal propagation path from the first base transceiver station to the second mobile communication device. Accordingly, different multipath signals may arrive at different time instants at the second mobile communication device. The time duration, which begins at the time instant that the first multipath signal arrives at the second mobile communication device and ends at the time instant that the last multipath signal arrives at the second mobile communication device is referred to as a delay spread. The second mobile communication device may utilize a rake receiver that allows the second mobile communication device to receive signal energy from a plurality of multipath signals received within a receive window time duration. The receive window time duration may comprise at least a portion of the delay spread time duration. Multipath signals, which are not received within the receive window time duration may also contribute to noise signal energy.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for per-cell interference estimation for interference suppression, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 9 is a block diagram illustrating exemplary steps for per-cell interference estimation and cancellation, in accordance with an embodiment of the invention

DETAILED DESCRIPTION OF THE INVENTION

Certain aspects of the invention may be found in a method and system for per-cell interference estimation for interference suppression. In various exemplary aspects of the invention, a wireless system may receive a plurality of multipath signals from a plurality of transmitters and allocate each of a plurality of per-cell modules for generating an interference suppressed signal from the plurality of multipath signals. Each of a plurality of data symbols may be sequentially processed in the received multipath signals utilizing the allocated plurality of per-cell modules and subtracting the processed symbols from a residual buffer storing the received multi path signals. Desired information received from one or more of the plurality of transmitters may be recovered utilizing the interference suppressed signal. Timing of the data symbols received from the plurality of transmitters may be correlated utilizing a cell chip combiner. The data symbols may be descrambled utilizing conjugated scrambling codes associated with one of the plurality of transmitters. A plurality of orthogonal variable spreading factor (OVSF) codes may be generated utilizing a Walsh transform on the plurality of data symbols. Power levels of the OVSF codes may be estimated, and estimated signals may be generated based on the OVSF codes and the estimated power levels. A plurality of residual signals may be generated based on a subtractive difference between the plurality of received multipath signals and the plurality of estimated signals. A plurality of addback signals may be generated based on an additive sum of the plurality of residual signals and the plurality of estimated signals. A plurality of updated estimated signals may be generated based on the plurality of addback signals and the plurality of weighting factor values. A plurality of incremental signals may be generated based on a subtractive difference between the plurality of updated estimated signals and the plurality of addback signals.

Figure 1:
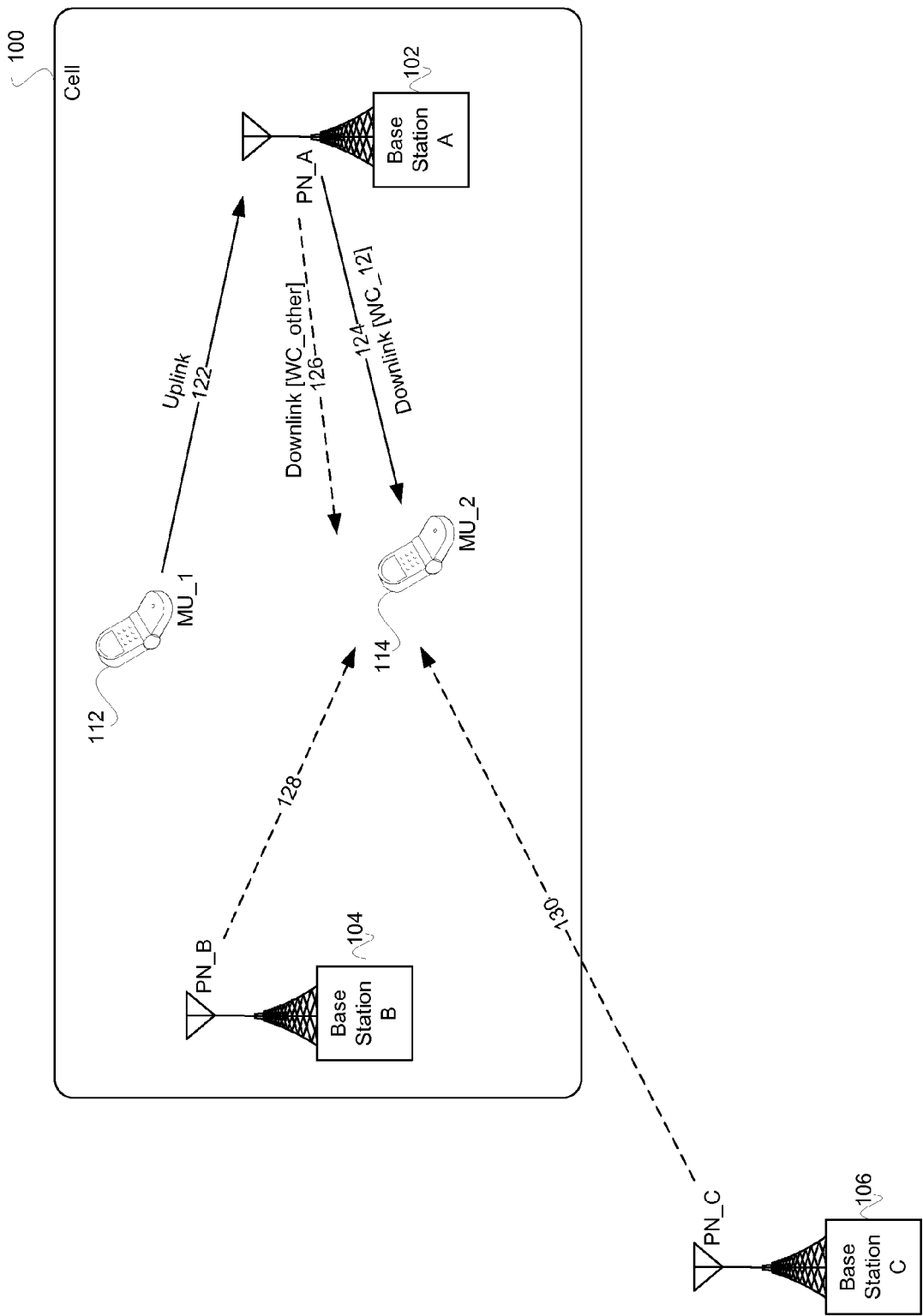
FIG. 1 is a diagram illustrating an exemplary wireless communication system, which is operable to provide interference suppression in WCDMA, in accordance with an embodiment of the invention.

FIG. 1 is an illustration of an exemplary wireless communication system, in accordance with an embodiment of the invention. Referring to FIG. 1, there is shown a cell 100 and a base station C 106. The cell 100 comprises base station A 102, base station B 104, mobile communication device MU_1 112 and mobile communication device MU_2 114. The base station 106 may be located outside of the cell 100.

The mobile communication devices MU_1 112 and MU_2 114 may be engaged in a communication via the base station A 102. The mobile communication device MU_1 112 may transmit signals to the base station A 102 via an uplink RF channel 122. In response, the base station A 102 may transmit signals to the mobile communication device MU_2 114 via a downlink RF channel 124. Signals transmitted by the base station A 102 may communicate chips that are generated utilizing a scrambling code PN_A. The signals transmitted via RF channel 124 may be spread utilizing a spreading code WC_12. The spreading code WC_12 may comprise an orthogonal variable spreading factor (OVSF) code, for example a Walsh code, which enables the mobile communication device MU_2 114 to distinguish signals transmitted by the base station A 102 via the downlink RF channel 124 from signals transmitted concurrently by the base station A 102 via other downlink RF channels, for example downlink RF channel 126. The base station A 102 may utilize one or more OVSF codes, WC_other, when spreading data transmitted via downlink RF channel 126. The one or more OVSF codes, WC_other, may be distinct from the OVSF code WC_12.

The mobile communication device MU_2 114 may receive MAI signals from RF channel 126, RF channel 128 and/or RF channel 130. As stated above, signals received via RF channel 126 may be transmitted by the base station A 102. Signals received via RF channel 128 may be transmitted by the base station B 104. Signals transmitted by the base station 104 may be scrambled based on a scrambling code PN_B. Signals received via RF channel 130 may be transmitted by the base station C 106. Signals transmitted by the base station C 106 may be scrambled based on a scrambling code PN_C.

The MU_2 114 may be operable to perform a soft handoff from the current serving base station A 102 to any of a plurality of base stations located within the cell 100, for example, the base station B 104. Accordingly, the MU_2 114 may be operable to process received signals based on scrambling code PN_A and/or scrambling code PN_B. In this regard, the mobile communication device MU_2 114 may listen for signals from both base station A 102 and base station B 104. The mobile communication device MU_2 114 may not be operable to perform a soft handoff from the current serving base station A 102 to a base station, which is outside of the cell 100, for example, the base station C 106. Accordingly, the mobile communication device MU_2 114 may not be operable to process received signals based on scrambling code PN_C. In this regard, MU_2 114 may not listen for signals from base station C 106.

While the desired signal at the mobile communication device MU_2 114 may be received via RF channel 124, the mobile communication device MU_2 114 may also receive signal energy via the RF channel 126, the RF channel 128 and/or the RF channel 130. The received signal energies from the RF channels 126, 128 and/or 130 may result in MAI, which may interfere with the ability of the mobile communication device MU_2 114 to receive desired signals via RF channel 124.

In various embodiments of the invention, the mobile communication device MU_2 may comprise suitable logic, circuitry and/or code that are operable to receive signal energy via the RF channels 124, 126, 128 and/or 130, and suppress interference signal energy received via the RF channels 126, 128 and/or 130. The mobile communication device MU_2 may utilize an iterative method for interference cancellation. The iterative method may comprise a weighting iteration, one or more weighting and addback iterations, and an addback iteration.

In an embodiment of the invention, the MU_2 may comprise a programmable interference suppression module that may be operable to process a transmitted 256-chip symbol sequentially. A subtractor residue buffer may communicate the samples to the interference suppression module, and may comprise cx2 samples, which may then be interpolated to cx8 samples in a cell chip combiner. The cx8 samples may be maximal ratio combined to a cx1 output of 256 chips which may be descrambled and communicated to a Fast Walsh Transform process module. The output of the Walsh Transform may represent the estimated signal for each of the OVSF codes.

The estimated signal may then be added to the associated stored signal estimation and then appropriately weighted. The difference between the newly generated signal estimation and the stored signal estimation may be communicated to an inverse Walsh Transform process module, the output of which may be descrambled and utilized to reconstruct the multipath signal to be subtracted from a subtractor, described further with respect to FIG. 4.

Figure 2:
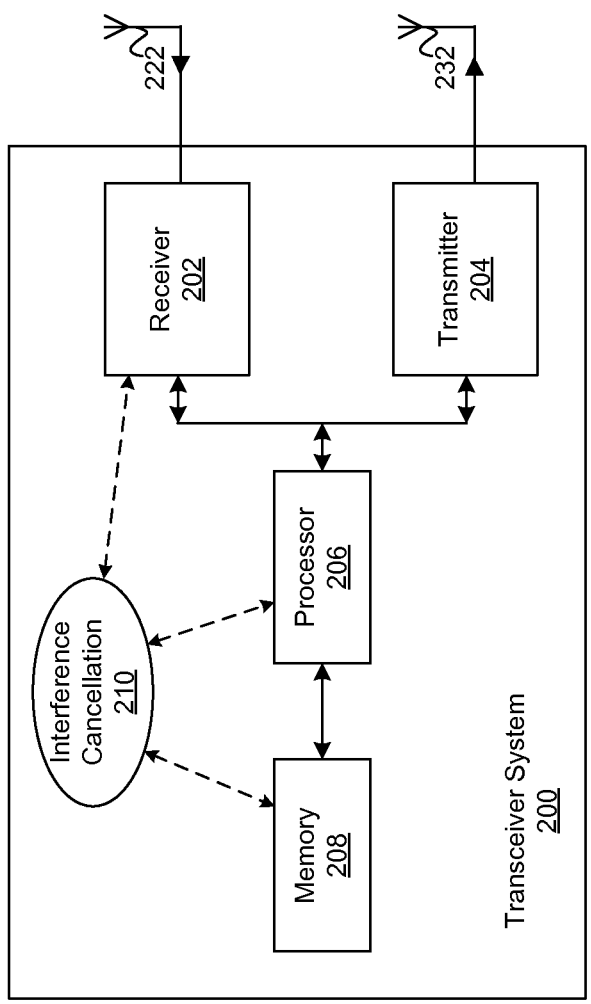
FIG. 2 is a diagram of an exemplary communication device, which is operable to provide interference suppression for WCDMA, in accordance with an embodiment of the invention.

FIG. 2 is a diagram of an exemplary communication device, which may utilize interference suppression for WCDMA, in accordance with an embodiment of the invention. Referring to FIG. 2, there is shown a transceiver system 200, a receiving antenna 222 and a transmitting antenna 232. The transceiver system 200 may comprise at least a receiver 202, a transmitter 204, a processor 206, an interference cancellation module 210 and a memory 208. Although a separate receiver 202 and transmitter 204 are shown in FIG. 2, the invention is not limited. In this regard, the transmit function and receive function may be integrated into a single transceiver module. The transceiver system 200 may also comprise a plurality of transmitting antennas and/or a plurality of receiving antennas, for example to support diversity transmission and/or diversity reception. Various embodiments of the invention may comprise a single antenna, which is coupled to the transmitter 204 and receiver 202 via a transmit and receive (T/R) switch. The T/R switch may selectively couple the single antenna to the receiver 202 or to the transmitter 204 under the control of the processor 206, for example.

The receiver 202 may comprise suitable logic, circuitry, interfaces and/or code that may be operable to perform receive functions that may comprise PHY layer function for the reception or signals. These PHY layer functions may comprise, but are not limited to, the amplification of received RF signals, generation of frequency carrier signals corresponding to selected RF channels, for example uplink or downlink channels, the down-conversion of the amplified RF signals by the generated frequency carrier signals, demodulation of data contained in data symbols based on application of a selected demodulation type, and detection of data contained in the demodulated signals. The RF signals may be received via the receiving antenna 222. The receiver 202 may process the received RF signals to generate baseband signals. A chip-level baseband signal may comprise a plurality of chips. The chip-level baseband signal may be descrambled based on a PN sequence and despread based on an OVSF code, for example a Walsh code, to generate a symbol-level baseband signal. The symbol-level baseband signal may comprise a plurality of data symbols. The receiver 202 may comprise a rake receiver, which in turn comprises a plurality of rake fingers to process a corresponding plurality of received multipath signals.

The transmitter 204 may comprise suitable logic, circuitry, interfaces and/or code that may be operable to perform transmit functions that may comprise PHY layer function for the transmission or signals. These PHY layer functions may comprise, but are not limited to, modulation of received data to generate data symbols based on application of a selected modulation type, generation of frequency carrier signals corresponding to selected RF channels, for example uplink or downlink channels, the up-conversion of the data symbols by the generated frequency carrier signals, and the generation and amplification of RF signals. The RF signals may be transmitted via the transmitting antenna 232.

The memory 208 may comprise suitable logic, circuitry, interfaces and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM).

The interference cancellation module 210 may comprise suitable logic, circuitry and/or code that are operable to suppress interference signals, relative to a desired signal, in a received signal. The received signal may comprise a desired signal and one or more interference signals. The interference cancellation module 210 may generate an interference suppressed version of the signal in which the signal level for the interference signals is reduced relative to the signal level for the desired signal.

In operation, the receiver 202 may receive signals via the receiving antenna 222. In an exemplary embodiment of the invention, the receiver 202 may comprise a rake receiver. The receiver 202 may communicate signals to the processor 206 and/or to the interference cancellation module 210.

The receiver 202 may generate timing information that corresponds to each of the fingers in the rake receiver portion of the receiver 202. Each of the fingers in the rake receiver may process a distinct one of a plurality of multipath signals that are received within a delay spread time duration. Based on received RF signals, the receiver may generate chip-level baseband signals. The receiver 202 may communicate the chip level baseband signals to the interference cancellation module 210. The rake receiver 202 may generate one or more symbol-level baseband signals based on a selected one or more OVSF codes and a selected one or more PN sequences. The symbol-level baseband signals may be communicated to the processor 206. The OVSF codes may be selected based on a specified desired user signal. For example, referring to FIG. 1, the rake receiver 202 associated with mobile communication device MU_2 may select an OVSF code, WC_12, and a PN sequence, PN_A, which may then be utilized to generate the symbol-level baseband signal from the chip-level baseband signal.

The processor 206 may utilize common pilot channel (CPICH) information, communicated by the signals received from the receiver 202, to compute a plurality of channel estimate values or, in various embodiments of the invention, the receiver 202 may compute the channel estimate values. The processor 206 and/or receiver 202 may compute one or more channel estimate values corresponding to each multipath signal, which was transmitted by a given base transceiver station and received at a finger in the rake receiver. The computed channel estimate values may be represented as a channel estimate matrix, $H_{bts,fgr}$, where bts represents a numerical index that is associated with a given base transceiver station and fgr is a numerical index that is associated with a given rake finger. The processor 206 may communicate the computed channel estimate values to the receiver 202 and to the interference cancellation module 210 and/or to the memory 208. The processor 206 may compute and/or select one or more interference cancellation parameter values, which control the signal interference cancellation performance of the interference cancellation module 210. The processor 206 may communicate the interference cancellation parameter values to the interference cancellation module 210 and/or to the memory 208.

The processor 206 may also determine which base transceiver stations are associated with a current cell 100 and which base transceiver stations are not associated with the current cell 100. For example, the processor 206 may determine that the base station A 102 and the base station B 104 are associated with the current cell 100, while the base station C 106 is not associated with the current cell 100. In an exemplary embodiment of the invention, the processor 206 may store PN sequence for at least a portion of the base transceiver stations that are associated with the current cell 100. For example, referring to FIG. 1, the processor 206 may generate and/or store corresponding PN sequences, for example PN_A and PN_B in the memory 208. The PN sequences PN_A and PN_B may be associated with the current cell 100.

In other exemplary embodiments of the invention, the processor 206 may store PN sequences for at least a portion of the base transceiver stations that are associated with the current cell 100 and at least a portion of the base transceiver stations that are not associated with the current cell 100. For example, referring to FIG. 1, the processor 206 may generate and/or store corresponding PN sequences, for example PN_A, PN_B and PN_C in the memory 208. In general, the processor 206 may store the PN sequences for the base transceiver stations from which a mobile communication device, for example the mobile communication device MC_2 114, may expect to receive signals and the processor 206 may store PN sequences from which the mobile communicating device may not expect to receive signals. The mobile communication device may expect to receive signals, for example common pilot channel (CPICH) signals, from a plurality of base transceiver stations in anticipation of a soft handoff from a current service base transceiver station to a subsequent serving base transceiver station.

In instances in which the transceiver system 200 utilizes a plurality of receiving antennas, for example the receiving antennas 222_1 and 222_2, the transceiver system 200 may utilize receive diversity. In a receive diversity system, the receiver 202 may receive a first set of signals via the receiving antenna 222_1 and a second set of signals via the receiving antenna 222_2. The processor 206 may compute a first set of channel estimate values corresponding to receiving antenna 222_1 and a second set of channel estimate values corresponding to receiving antenna 222_2. The computed channel estimate values may be represented as a channel estimate matrix, $H_{bts,rx,fgr}$, where rx represents a numerical index that is associated with a given receiving antenna. In various embodiments of the invention, which utilize receive diversity, the receiver 202 and/or the interference cancellation module 210 may also process signals that are transmitted by base transceiver stations, which utilize signal transmission diversity.

The interference cancellation module 210 may receive signals from the receiver 202, which correspond to received multipath signals. The signals received by the interference cancellation module 210 may comprise chip-level baseband signals. A plurality of chips, for example 256 chips, may be associated with a data symbol. The interference cancellation module 210 may be operable to determine a time duration that corresponds to a data symbol processing period. The interference cancellation module 210 may be operable to determine whether to perform iterations of a signal interference suppression method on received chip-level baseband signals and/or symbol-level baseband signals, in accordance with an embodiment of the invention, during each data symbol processing period. The determination of whether to perform iterations of the signal interference suppression method may be based on, for example, the time instants at which chips, which are associated with a current data symbol and/or subsequent data symbol, arrive at the receiver 202 via received RF signals.

The interference cancellation module 210 may retrieve a plurality of channel estimate values, one or more PN sequences, a plurality of OVSF codes, and one or more interference cancellation parameter values from memory 208. The interference cancellation module 210 may receive timing information from the receiver 202 that corresponds to each of the fingers in the rake receiver portion of the receiver 202.

The interference cancellation module 210 may process received signals, utilizing received timing information and channel estimate values to combine the multipath signals, which are associated with corresponding fingers in the rake receiver. In various embodiments of the invention, the interface cancellation module 210 may combine the multipath signals to generate a combined chip-level signal by utilizing, for example, maximal ratio combining (MRC) and/or equal gain combining (EGC). The interference cancellation module 210 may process the combined chip-level signal, by utilizing PN sequences and OVSF codes, to determine a signal level associated with each of the plurality of OVSF codes for each of one or more selected PN sequences. In an exemplary embodiment of the invention, the plurality of OVSF codes comprises 256 Walsh codes. Each signal associated with an OVSF code may be referred to as a corresponding user signal. For example, a signal associated with a $j^{th}$ OVSF code may be referred to as a $j^{th}$ user signal. Referring to FIG. 1, for example, the OVSF code WC_12 may be associated with a user signal that is transmitted from base station A 102 to the mobile communication device MC_2 114.

The interference cancellation module 210 may compute a signal power level value and a noise power level value corresponding to each of the user signals. Based on the computed signal power level value, noise power level value and the one or more interference cancellation parameter values, the interference cancellation module 210 may compute a weighting factor value corresponding to each user signal. The plurality of weighting factor values associated with each base transceiver station may be represented as a weighting factor matrix, $A_{bts}$, where bts represents a numerical index value that is associated with a given base transceiver station. In an exemplary embodiment of the invention, the weighting factor values for a given base transceiver station may be computed as shown in the following equations:

$$z(j) \cong \frac{\lambda x^2(j)}{\lambda x^2(j) + y^2(j)} \text{ when} \quad [1a]$$

$$x^2(j) > \gamma y^2(j) \text{ and}: \quad [1b]$$

$$z(j) = 0 \text{ when} \quad [1c]$$

$$x^2(j) \le \gamma y^2(j) \quad [1d]$$

where z(j) represents the weighting factor value for the $j^{th}$ user signal, $x^2(j)$ represents the signal power level value for the $j^{th}$ user signal, which was generated by descrambling a received signal based on a PN sequence for the given base transceiver station, $y^2(j)$ represents the noise power level value for the $j^{th}$ user signal, which was generated by descrambling the received signal based on the PN sequence for the given base transceiver station, and λ and γ represent interference cancellation parameter values.

The weighting factor values z(j) may correspond to a signal to noise ratio (SNR) measure for the $j^{th}$ user signal. Values for z(j) may be within the range 0≤z(j)≤1. In one regard, the values of z(j) may be an a priori measure of confidence that a given user signal comprises valid signal energy that was transmitted by the base transceiver station. A "user" and an OVSF code are not necessarily equivalent. Accordingly a user may occupy multiple OVSF codes, and a user with a short spreading factor may project energy into multiple OVSF codes.

The interference cancellation module 210 may be operable to process chip-level signals received from each of a plurality of rake fingers in the receiver 202 to generate corresponding interference suppressed chip-level signals based on an iterative method for interference cancellation, in accordance with an embodiment of the invention. The interference suppressed chip-level signals may be output to each corresponding rake finger. Each of the rake fingers may then process its respective interference suppressed chip-level signals.

The weighting factor value z(j) may be a function of the interference cancellation parameter values λ and γ. In various embodiments of the invention, the interference cancellation parameters λ and γ may comprise integer and/or non-integer values. In an exemplary embodiment of the invention, λ=1 and γ=1. The processor 206 may be operable to monitor the interference cancellation performance of the interference cancellation module 210, for example by measuring SNR values for processed signals generated by the receiver 202 based on interference suppressed chip-level signals. Accordingly, the processor 206 may be operable to adjust one of both interference cancellation parameter values λ and γ.

In an embodiment of the invention, the interference cancellation module 210 may be operable to sequentially process a transmitted 256-chip symbol. A subtractor residue buffer may communicate the samples to a suppression module, and may comprise cx2 samples, which may then be interpolated to cx8 samples in a cell chip combiner. The cx8 samples may be maximal ratio combined to a cx1 output of 256 chips which may be descrambled and communicated to a Fast Walsh Transform process module. The output of the Walsh Transform may represent the estimated signal for each of the OVSF codes.

The estimated signal may then be added to the associated stored signal estimation and then appropriately weighted. The difference between the newly generated signal estimation and the stored signal estimation may be communicated to an inverse Walsh Transform process module, the output of which may be rescrambled and utilized to reconstruct the multipath signal to be subtracted from a subtractor, described further with respect to FIG. 4.

Figure 3:
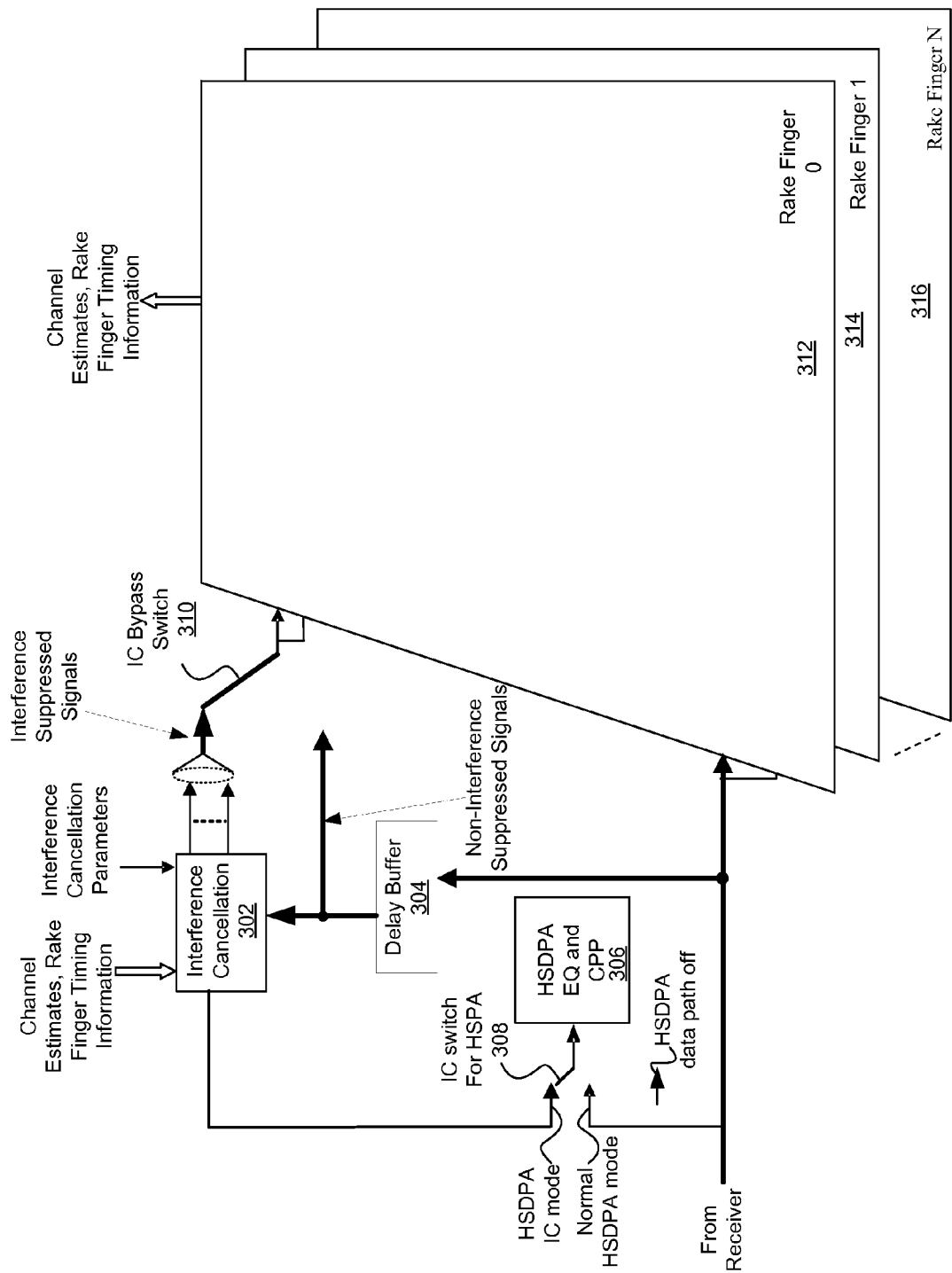
FIG. 3 is a diagram of an exemplary WCDMA receiver with interference suppression, in accordance with an embodiment of the invention.

FIG. 3 is a diagram of an exemplary WCDMA receiver with interference suppression, in accordance with an embodiment of the invention. Referring to FIG. 3, there is shown an interference cancellation module 302, a delay buffer 304, a HSDPA processor 306, an HSDPA switching device 308, interference cancellation (IC) bypass switching device 310, and a plurality of rake fingers 312, 314 and 316. The interference cancellation module 302 may correspond to the interference cancellation module 210 as presented in FIG. 2. The rake fingers 312, 314 and 316 represent fingers in a rake receiver. In an exemplary embodiment of the invention, the HSDPA switching device 308 and the IC bypass switching device 310 may be configured by the processor 206.

The delay buffer 304 may comprise suitable logic, circuitry, interfaces and/or code that may be operable to receive a signal level value as input at a given input time instant and output the signal level value at a subsequent output time instant. The time duration between the input time instant and the output time instant may be referred to as a delay time duration. In an exemplary embodiment of the invention, the delay time duration corresponds to 512 chips.

The HSDPA processor 306 may comprise suitable logic, circuitry, interfaces and/or code that may be operable to provide HSDPA processing of received signals.

In operation, the HSDPA switching device 308 may comprise suitable logic, circuitry, interfaces and/or code that are operable to select an input signal to the HSDPA processor 306. As shown in FIG. 3, the HSDPA switching device 308 is configured so that it is operable to supply an interference suppressed signal, generated by the interference cancellation module 302, as an input to the HSDPA processor 306. As indicated in FIG. 3, this configuration of the HSDPA switching device 308 may result in the HSDPA switching device 308 operating in a HSDPA interference cancellation (IC) mode.

The HSDPA switching device 308 may also be configured so that it is operable to supply a baseband signal, generated by the receiver 202, as an input to the HSDPA processor 306. As indicated in FIG. 3, this configuration of the HSDPA switching device 308 may result in the HSDPA switching device 308 operating in a normal HSDPA mode.

The HSDPA switching device 308 may also be configured such that no input signal is supplied to the HSDPA processor 306. As indicated in FIG. 3, this configuration of the HSDPA switching device 308 may result in the HSDPA switching device 308 operating in a HSDPA data path off mode.

The IC bypass switching device 310 may comprise suitable logic, circuitry, interfaces and/or code that are operable to select an input signal to the rake fingers 312, 314 and 316. As shown in FIG. 3, the IC bypass switching device 310 is configured so that it is operable to supply an interference suppressed signal, generated by the interference cancellation module 302, as an input to the rake fingers 312, 314 and 316.

The IC bypass switching device 310 may also be configured so that it is operable to supply a signal, which is output from the delay buffer 304, as an input to the rake fingers 312, 314 and 316. The signal output from the delay buffer 304 may comprise a time-delayed version of a baseband signal generated by the receiver 202. As indicated in FIG. 3, the signal output from the delay buffer 304 may comprise a non-interference suppressed signal.

Each of the rake fingers 312, 314 and 316 may receive, as input, a baseband signal generated by the receiver 202. Based on the respective input baseband signal from the receiver 202, each rake finger 312, 314 and 316 may generate channel estimates and rake finger timing information. In various embodiments of the invention, each rake finger 312, 314 and 316 may generate the channel estimates and/or rake finger timing information for selected multipath signals based on CPICH data received via the input baseband signals received from the receiver 202. In an exemplary embodiment of the invention, which comprises a receive diversity system, channel estimates and/or rake finger timing information may be generated for RF signals received at the receiver 202 via at least a portion of a plurality of receiving antennas. Each rake finger 312, 314 and 316 may communicate its respective channel estimates and/or rake finger timing information to the interference cancellation module 302.

In various embodiments of the invention, the interference cancellation module 302 may receive chip-level signals from the delay buffer 304. Based on the channel estimates and rake finger timing information, the interference cancellation module 302 may select individual multipath signals from the chip-level signals received via the delay buffer 304. Based on the interference cancellation parameters, the interference cancellation module 302 may process received chip-level multipath signals by utilizing an iterative method for interference cancellation, in accordance with an embodiment of the invention.

The chip-level signals received from the delay buffer 304 may comprise a plurality of multipath signals received from one or more base transceiver stations. The interference cancellation module 302 may be configurable to assign signal processing resources to perform the iterative method of interference cancellation for selected multipath signals. The selected multipath signals may be received from one or more base transceiver stations. The processor 206 may configure the interference cancellation module 302 to receive multipath signals from one or more base transceiver stations. In an exemplary embodiment of the invention, which comprises a receive diversity system, the selected multipath signals may be received via one or more of a plurality of receiving antennas. The processor 206 may configure the interference cancellation module 302 for receive diversity.

The interference cancellation module 302 may receive interference cancellation parameters from the processor 206 and/or from the memory 208. In an exemplary embodiment of the invention, the interference cancellation module 302 may retrieve PN sequences and/or OVSF codes from the memory 208. The interference cancellation module 302 may a PN sequence for each of the base transceiver stations from which the interference cancellation module 302 is configured to attempt to receive a signal.

The interference cancellation module 302 may compute weighting factor values for each of the potential user signals contained within a given chip-level signal as shown, for example, in equations [1]. A plurality of weighting factors may be computed for each potential user signal, for each of the base transceiver stations from which the interference cancellation module 302 is configured to receive a signal and/or for each receiving antenna from which the receiver 202 may receive a signal.

The interference cancellation module 302 may be operable to compute the weighting factors for a given receiving antenna and for a given base transceiver station by combining received chip-level signals corresponding to the given receiving antenna, based on the corresponding channel estimate values, to generate combined chip-level signals. The interference cancellation module 302 may be operable to descramble the combined chip-level signals by utilizing a descrambling code based on the PN sequence corresponding to the given base transceiver station. The interference cancellation module 302 may generate a user signal for each potential user by despreading the descrambled chip-level signals by utilizing a plurality of potential OVSF codes, for example Walsh codes. In an exemplary embodiment of the invention, the despreading of the descrambled chip level signals by the plurality of potential OVSF codes may comprise a Walsh transform operation. The exemplary Walsh transform operation may generate a plurality of user signals, for which each of the plurality of user signals may comprise a symbol-level baseband signal. The interference cancellation module 302 may be operable to compute a weighting factor, $z(j)$, corresponding to a $j^{th}$ user signal based on the corresponding $j^{th}$ user symbol-level baseband signal. Each weighting factor, $z(j)$, may be stored in the memory 208.

During a weighting iteration, the interference cancellation module 302 may be operable to multiply an initial $j^{th}$ user symbol-level baseband signal and the corresponding weighting factor value to generate a current estimated $j^{th}$ user symbol-level baseband signal. The current estimated $j^{th}$ user symbol-level baseband signal represents a first estimate of an interference suppressed version of the initial received signal.

The weighting iteration may be repeated for each user signal, for each base transceiver station and/or for each receiving antenna. Each of the current estimated $j^{th}$ user symbol-level baseband signal may be stored in the memory 208. The current estimated symbol-level baseband signal for the potential users may be represented as shown in the following equation:

$$B_{rx}(1) = \sum_{bts=1}^{N\_BTS} \sum_{fgr=1}^{N\_FGR} A_{rx}(bts) C^H S^H(bts) H_{rx}(bts, fgr) Y_{rx}(fgr) \qquad [2]$$

where $B_{rx}(1)$ represents a vector representation of current estimated symbol-level baseband signals for the potential users for signals received via a given receiving antenna rx; $A_{rx}(bts)$ represents a matrix representation for the weighting scale factors z(j) for the potential users for a given base station bts and for the given receiving antenna rx; $H_{rx}(bts,fgr)$ represents the channel estimate matrix $H_{bts,rx,fgr}$ for a given rake finger fgr; N_FGR represents the number of rake fingers 312, 314 and 316 in the rake receiver and N_BTS represents the configured number of base stations for the receiver 202; $Y_{rx}(fgr)$ represents the signal received via a given receiving antenna rx at a given rake finger fgr; $C^H$ represents a complex conjugate transformed version of a channelization matrix C and $S^H(bts)$ represents a complex conjugate transformed version of a PN sequence matrix S(bts). The matrix C may comprise a matrix representation of OVSF codes for the potential users and the matrix S(bts) may represent PN sequences for the base station bts. In an exemplary embodiment of the invention, the matrix $C^H$ may comprise a Walsh transform matrix.

In various embodiments of the invention in which the receiver 202 utilizes a plurality of receiving antennas, data received via the symbol-level signals corresponding to the plurality of receiving antennas may be decoded by utilizing various diversity decoding methods. Various embodiments of the invention may also be practiced when the receiver 202 is utilized in a multiple input multiple output (MIMO) communication system. In instances where the receiver 202 is utilized in a MIMO communication system, data received via the symbol-level signals, received via the plurality of receiving antennas, may be decoded by utilizing various MIMO decoding and/or diversity decoding methods.

The interference cancellation module 302 may generate a current estimated chip-level signal by spreading each of the plurality of j estimated symbol-level baseband signals by a corresponding OVSF code. In an exemplary embodiment of the invention, the spreading of symbol-level baseband signals by the plurality of potential OVSF codes may comprise an inverse Walsh transform operation. The inverse Walsh transformed estimated symbol-level baseband signals may be scrambled by the corresponding PN sequence to generate current estimated chip-level baseband signals. For each scrambling operation a plurality, corresponding to the number of rake fingers 312, 314 and 316, of current estimated chip-level baseband signals may be generated. The inverse Walsh transform and spreading operations may be repeated for each of the base transceiver stations and/or the receiving antennas.

During a subsequent weighting and addback iteration, the interference cancellation module 302 may subtract the current estimated chip-level baseband signals corresponding to a given receiving antenna from the received chip-level baseband signals corresponding to the given receiving antenna to generate a current residual chip-level signal corresponding to the given receiving antenna. The current residual chip-level signal represents a first estimate of the interference signal level value in the received signal. In various embodiments of the invention, the current residual chip-level signal corresponding to a given antenna may be represented as shown in the following equation:

$$R_{rx,fgr}(2) = Y_{rx,fgr} - \sum_{bts=1}^{N\_BTS} H_{rx,fgr}(bts) S(bts) CB(1) \qquad [3]$$

where $R_{rx,fgr}(2)$ represents the current residual chip level signal for rake finger fgr corresponding to receiving antenna rx, $Y_{rx,fgr}$ represents the chip-level signal for rake finger fgr wherein the chip-level signal was received via receiving antenna rx and $H_{rx,fgr}(bts)$ represents the channel estimate matrix $H_{bts,rx,fgr}$ for a given base station bts. In an exemplary embodiment of the invention, the matrix C may comprise an inverse Walsh transform matrix.

The interference cancellation module 302 may be operable to generate a plurality of current residual symbol-level baseband signals for each potential user for each base transceiver station and/or receiving antenna based on corresponding current residual chip-level signals by a method as is substantially described above. For a current $j^{th}$ user residual symbol-level baseband signal, the interference cancellation module 302 may add the current estimated $j^{th}$ user symbol-level baseband signal, as computed during the weighting iteration, to generate a current $j^{th}$ user addback symbol-level baseband signal. The current $j^{th}$ user addback symbol-level baseband signal represents a first representation of the received signal as comprising an interference suppressed component (the current estimated $j^{th}$ user symbol-level baseband signal) and an interference component (the current $j^{th}$ user residual symbol-level baseband signal), which may be represented as shown in the following equation:

$$P_{rx}(2) = D_{rx}(2) + B_{rx}(1) \qquad [4]$$

where $P_{rx}(2)$ represents a vector representation of the current addback symbol-level baseband signals for the potential users. $D_{rx}(2)$ represents a vector representation of the residual symbol-level baseband signals, which may be represented as shown in the following equation:

$$D_{rx}(2) = \sum_{bts=1}^{N\_BTS} \sum_{fgr=1}^{N\_FGR} A_{rx}(bts) C^H S^H(bts) H_{rx}(bts, fgr) R_{rx}(2)(fgr) \qquad [5]$$

where $R_{rx}(2)(fgr)$ represents the current residual chip-level signal $R_{rx,fgr}(2)$.

The interference cancellation module 302 may be operable to multiply the current $j^{th}$ user addback symbol-level baseband signal and the corresponding weighting factor value to generate an updated estimated $j^{th}$ user symbol-level baseband signal. The updated estimated symbol-level baseband signals may be represented as shown in the following equation:

$$B_{rx}(2) = \sum_{bts=1}^{N\_BTS} A_{rx}(bts)[D_{rx}(2) + B_{rx}(1)] \qquad [6]$$

where $B_{rx}(2)$ represents a vector representation of updated estimated symbol-level baseband signals for the potential users.

The interference cancellation module 302 may be operable to subtract the current estimated $j^{th}$ user symbol-level baseband signal, as computed during the weighting iteration, from the updated estimated $j^{th}$ user symbol-level baseband signal to generate an incremental estimated $j^{th}$ user symbol-level baseband signal. The incremental estimated $j^{th}$ user symbol-level baseband signal represents an adjustment to the first estimate of the interference suppressed version of the received signal level, which was computed during the weighting iteration. The incremental estimated symbol-level baseband signals may be represented as shown in the following equation:

$$L_{rx}(2)=B_{rx}(2)-B_{rx}(1) \qquad [7]$$

where $L_{rx}(2)$ represents a vector representation of the incremental estimated symbol-level baseband signals.

The weighting and addback iteration may be repeated for each user signal, for each base transceiver station and/or for each receiving antenna. Each updated estimated $j^{th}$ user symbol-level baseband signal may be stored in the memory 208.

The interference cancellation module 302 may be operable to generate an incremental estimated chip-level signal based on the incremental symbol-level baseband signals, for each potential user, for each base transceiver station and/or for each receiving antenna, by performing inverse Walsh transform and spreading operations substantially as described above.

The interference cancellation module 302 may be operable to subtract the incremental estimated chip-level signals corresponding to a given receiving antenna from the current residual chip-level signal corresponding to the given receiving antenna to generate an updated residual chip-level signal for the given receiving antenna. The interference cancellation module 302 may generate an updated residual chip-level signal for each receiving antenna. In various embodiments of the invention, the updated residual chip-level signal corresponding to a given antenna may be represented as shown in the following equation:

$$R_{rx,fgr}(3) = R_{rx,fgr}(2) - \sum_{bts=1}^{N\_BTS} H_{rx,fgr}(bts)S(bts)CL(2) \qquad [8]$$

where $R_{rx,fgr}(3)$ represents the updated residual chip level signal for rake finger fgr corresponding to receiving antenna rx.

In instances where the HSDPA processor 306 is operating in HSDPA IC mode, the interference cancellation module 302 may associate a cell identification value, cid, with each of the incremental estimated chip-level signals corresponding to a given receiving antenna. The interference cancellation module 302 may be operable to determine whether to subtract a given incremental estimated chip-level signal corresponding to the given receiving antenna from the current residual chip-level signal corresponding to the given receiving antenna based on the corresponding cid value for the incremental estimated chip-level signal. In various embodiments of the invention, each cid value may correspond to a PN sequence. In an exemplary embodiment of the invention, the interference cancellation module 302 may not subtract a given incremental estimated chip-level signal from the current residual chip-level signal when the corresponding cid value is associated with the current cell from which the receiver 202 expects to receive signals. The resulting generated updated residual chip-level signal may be communicated to the HSDPA processor 306.

During an addback iteration, the interference cancellation module 302 may be operable to generate a plurality of updated residual symbol-level baseband signals for each potential user for each of the base transceiver stations and/or the receiving antenna based on corresponding updated residual chip-level signals by a method, which is substantially described above. For a $j^{th}$ user updated residual symbol-level baseband signal, the interference cancellation module 302 may add the updated estimated $j^{th}$ user symbol-level baseband signal, as computed during the weighting and addback iteration, to generate a $j^{th}$ user interference suppressed symbol-level baseband signal. The interference suppressed symbol-level baseband signals may be represented as shown in the following equation:

$$P_{rx}(3)=D_{rx}(3)+B_{rx}(2) \qquad [9]$$

where $P_{rx}(2)$ represents a vector representation of the interference suppressed symbol-level baseband signals for the potential users and $D_{rx}(3)$ represents the updated residual symbol-level signal based on $R_{rx,fgr}(3)$.

The interference cancellation module 302 may be operable to generate an interference suppressed chip-level baseband signal based on the interference suppressed symbol-level baseband signals, for each potential user, for each base transceiver station and/or for each receiving antenna, by performing inverse Walsh transform and spreading operations substantially as described above. Each of the generated interference suppressed chip-level baseband signals may be communicated to a corresponding one of the rake fingers 312, 314 and 316.

In various embodiments of the invention, the rake fingers 312, 314 and 316 and/or HSDPA processor 306 may be operable to process the interference suppressed chip-level baseband signals. In instances in which the interference cancellation bypass switching device 310 is configured to select an output signal from the delay buffer 304, the rake fingers 312, 314 and 316 may process non-interference suppressed chip-level baseband signals. In instances in which the HSDPA switching device 308 is configured to place the HSDPA processor 306 in normal HSDPA mode, the HSDPA processor 306 may process non-interference suppressed chip-level baseband signals.

In an embodiment of the invention, the interference cancellation module 210 may be operable to sequentially process a transmitted 256-chip symbol. A subtractor residue buffer may communicate the samples to a suppression module, and may comprise cx2 samples, which may then be interpolated to cx8 samples in a cell chip combiner. The cx8 samples may be maximal ratio combined to a cx1 output of 256 chips which may be descrambled and communicated to a Fast Walsh Transform process module. The output of the Walsh Transform may represent the estimated signal for each of the OVSF codes.

The estimated signal may then be added to the associated stored signal estimation and weighted. The difference between the newly generated signal estimation and the stored signal estimation may be communicated to an inverse Walsh Transform process module, the output of which may be rescrambled and utilized to reconstruct the multipath signal to be subtracted from a subtractor, described further with respect to FIG. 4.

Figure 4:
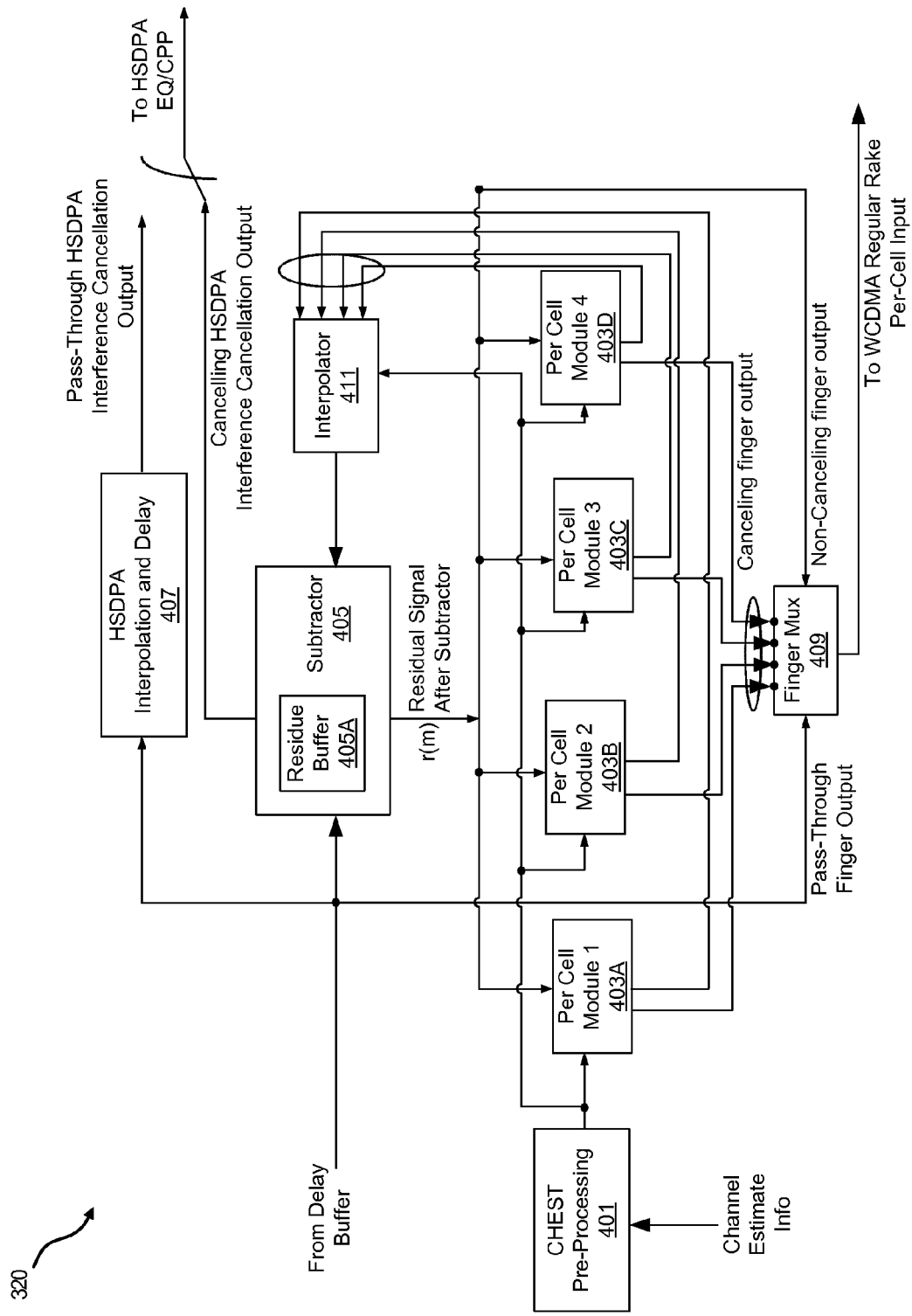
FIG. 4 is a block diagram illustrating an exemplary interference cancellation module, in accordance with an embodiment of the invention.

FIG. 4 is a block diagram illustrating an exemplary interference cancellation module, in accordance with an embodiment of the invention. Referring to FIG. 4, there is shown a interference cancellation module 320 comprising a channel estimate (CHEST) pre-processing module 401, per-cell modules 1 403A, 2 403B, 3 403C, 4 403D, a subtractor 405, an HSDPA interpolation and delay module 407, a finger MUX 409, and an interpolator 411.

The CHEST pre-processing module 401 may comprise suitable circuitry, logic, interfaces, and/or code that may be operable to normalize channel estimate information for each of the per-cell modules, the per-cell Modules 1-4 403A-403D.

The per-Cell modules 1-4 403A-403D may comprise suitable circuitry, logic, interfaces, and/or code that may be operable to estimate a received signal for each of a plurality of OVSF coded signals. The per-cell modules 1-4 403A-403D may process a multi-path signal associated with a transmitted 256-chip symbol, for example, on a sequential basis. In this manner, desired signals may be substantially separated out of the received signal, leaving mostly interference signals that may subsequently be removed.

In an exemplary embodiment of the invention, the four per-cell modules 1-4 403A-403D may enable interference cancellation for four non-diversity transmit (Tx) cells, two Tx diversity cells, one Tx diversity cell and two non-Tx diversity cells, one Tx diversity cell with two scrambling codes per antenna, and/or one non Tx-diversity cell that has four scrambling codes. Notwithstanding, the invention need not be so limited, and may support any number of cells depending on the number of Per-Cell modules integrated in the interference cancellation module.

The subtractor 405 may comprise suitable circuitry, logic, interfaces, and/or code that may be operable to subtract interpolated estimated signals from received signals for reducing interference signals. The subtractor 405 may also comprise a residual buffer 405A for storing processed data. In an embodiment of the invention, the residual buffer 405A may comprise a WCDMA section and a HSDPA section. The subtractor 405 may be operable to receive as inputs, signals that are generated by the per-cell modules 1-4 403A-403D, which may be interpolated by the interpolator 411, as well as 256-chip samples from the delay buffer 304.

The HSDPA interpolation and delay module 407 may comprise suitable circuitry, logic, interfaces, and/or code that may be operable to provide a bypass path for signals received from the delay buffer 304. The HSDPA interpolation and delay module 407 may interpolate cx2 samples to cx16 samples, for example, and may introduce a fixed delay that equals the delay of the interference cancellation module 302 when operating in interference cancellation mode.

The finger MUX 409 may comprise suitable circuitry, logic, interfaces, and/or code that may be operable to select from the plurality of signals generated by the per-cell modules 1-4 403A-403D, the input signal from the delay buffer 304, or a non-cancelling finger input. In this manner, the finger MUX 409 may enable a pass-through mode, an interference cancelling mode, or a non-cancelling mode.

The interpolator 411 may comprise suitable circuitry, logic, interfaces, and/or code that may be operable to interpolate a received signal, such as a cx1 signal and output a cx2 signal, for example.

In operation, a sample input may be received from the delay buffer 304 at a burst of 256-chip worth of samples every 256-chip period. The sampling rate at the input may be Cx2. Another input to the interference cancellation module 320 may comprise data from rake finger CPICH processing module, which may provide the interference cancellation module 320 with channel estimation, time tracking and scrambling code information. The interference cancellation module 320 may generate a single HSDPA output data stream per Rx antenna at Cx16, and multiple per-finger per-Rx-antenna Rake finger output data streams at Cx8, for example.

In HSDPA pass-through mode, the interference cancellation module 320 input samples may be routed via the HSDPA interpolation and delay module 407, which may interpolate Cx2 samples to Cx16 samples and introduce a fixed delay that equals the delay of the interference cancellation module 320, as if operating in HSDPA canceling mode. For pass-through mode rake fingers, the interference cancellation module 320 input samples may be communicated directly to the finger MUX 409, where the Cx2 samples may be interpolated to Cx8 samples and delayed before sending to the associated fingers. The delay may be equal to the interference cancellation module 320 delay as if the module were operating in canceling mode.

In instances where the interference cancellation module 320 is engaged, where at least one rake finger is in the "canceling mode", or HSDPA is in the canceling mode, the interference cancellation module 320 input samples may be communicated to the subtractor 405. The subtractor 405 may subtract the estimated signal and interference from the original interference cancellation module 320 input samples and generate a common data source for further signal estimation in the downstream per-cell modules, the per-cell modules 1-4 403A-403D. The subtractor 405 may also generate the Canceling HSDPA Output data stream and the Non-Canceling finger output which may comprise a Cx8 output data stream communicated to the finger MUX 409. The subtractor 405 may comprise a Cx2 residue buffer that may be operable to store 3×256 chips worth of samples. The residue buffer may also generate polyphase Cx8 samples for each of the per-cell modules 1-4 403A-403D.

The per-cell modules 1-4 403A-403D may estimate the received signal for each of the SF256 OVSF codes, for example. The estimated signal may be summed and reconstructed with the channel estimation by the interpolator 411 and fed back into the subtractor 405. Each of the per-cell modules 1-4 403A-403D may be operable to receive scrambling code information, associated finger channel estimation and time tracking information from the CHEST pre-processing module 401 as well the subtractor 405 output. Each of the per-cell modules 1-4 403A-403D may be associated with one transmit antenna from a cell. In the case of no Tx diversity, each cell may be associated with one per-cell module; in the case of Tx diversity, each per-cell module is associated with one transmit antenna out of the two transmit antennas of a cell.

The per-cell modules 1-4 403A-403D may generate reconstructed Cx1 per-path signals. The signals may be interpolated to the correct branch of a Cx8 polyphase filter and summed up as a Cx2 signal in the interpolator 411.

Figure 5:
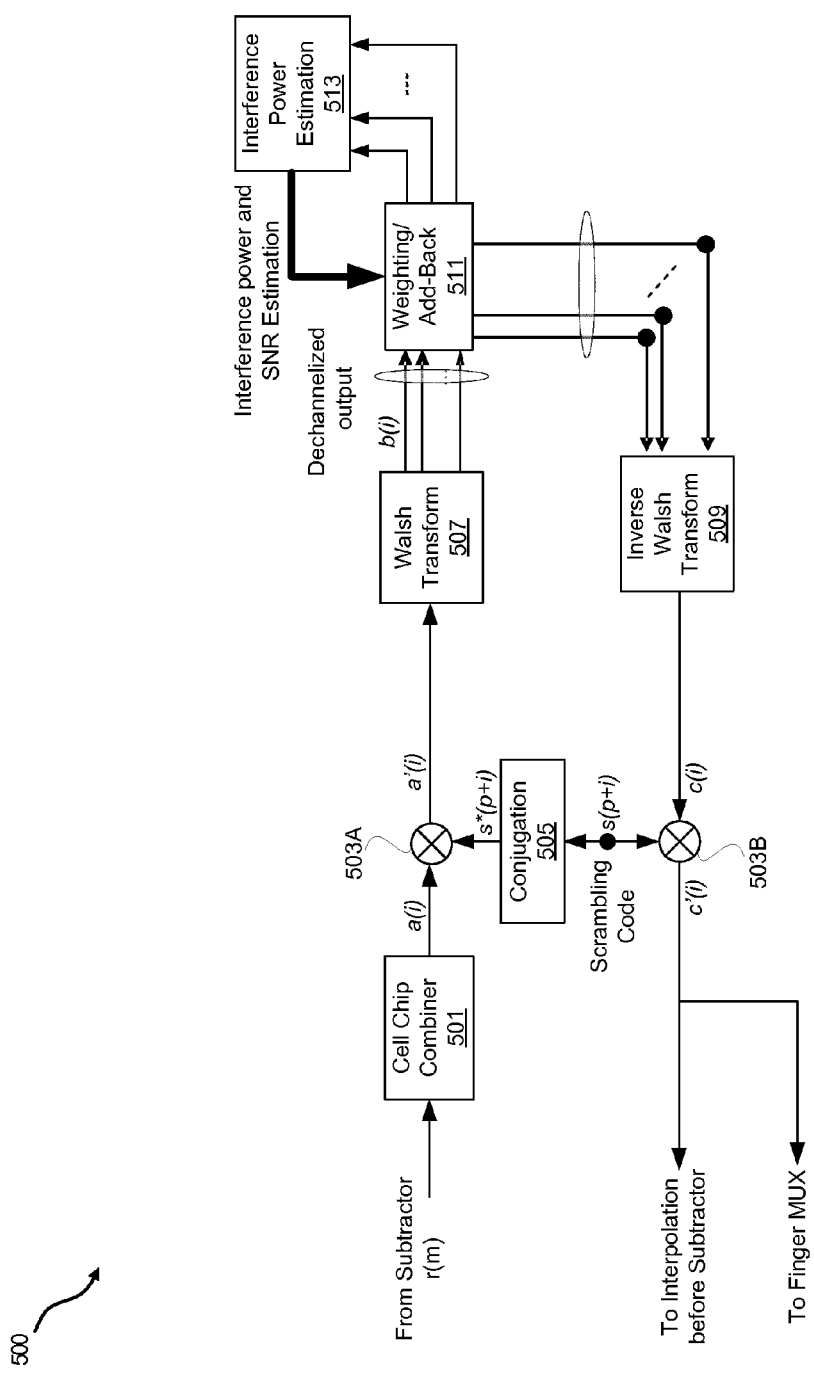
FIG. 5 is a block diagram illustrating an exemplary interference cancellation per-cell module, in accordance with an embodiment of the invention.

FIG. 5 is a block diagram illustrating an exemplary interference cancellation per-cell module, in accordance with an embodiment of the invention. Referring to FIG. 5, there is shown an per-cell module 500 comprising a cell chip combiner 501, multipliers 503A and 503B, a conjugation module 505, a Walsh transform module 507, and inverse Walsh transform module 509, a weighting and add-back module 511, and an interference power estimation module 513.

The cell chip combiner 501 may comprise suitable circuitry, logic, interfaces, and/or code that may be operable to interpolate and maximal ratio combine samples to generate a cx1 output of 256 chips, for example. The cell chip combiner 501 may be described further with respect to FIG. 6.

The multipliers 503A and 503B may comprise suitable circuitry, logic, interfaces, and/or code that may be operable to multiply signals. For example, the multiplier 503A may multiply the output of the cell chip combiner 501, a(i) by the conjugate of the scrambling code, s*(p+i), to result in the signal a'(i). The scrambling code s(p+i) may be associated with the cell with the code phase p given by the interference cancellation module 302, for example, and may comprise an integer multiple of 256.

The conjugation module 505 may comprise suitable circuitry, logic, interfaces, and/or code that may be operable to conjugate the scrambling code s(p+1) to generate the descrambling code s*(p+i).

The Walsh transform module 507 may comprise suitable circuitry, logic, interfaces, and/or code that may be operable to separate a received signal into a plurality of output signals defined by a plurality of OVSF codes, such as SF256, for example. In this manner, the output of the Walsh transform module 507 may represent the signal for each of the SF256 OVSF codes. The Walsh transform module 507 may be operable to receive a serial input a'(i) and generate a parallel output. Exemplary pseudo-codes for the Walsh transform may be as follows:

```
Initialize b(i)=a(i), for i=0, . . . ,255;
For Level=0:7
    For i=0:Level
        SF = 256>>Level;
        For j=0:SF/2
            x=b(i*SF+j);
            y=b(i*SF+(SF/2)+j);
        end
    end
End
``` where wbw(i) represents a bit width and wshift(i) represents a downshift value.

The inverse Walsh transform module 509 may comprise suitable circuitry, logic, interfaces, and/or code that may be operable to generate a single 256-chip output from a plurality of signals, such as SF256 OVSF code signals, for example. The inverse Walsh transform module 509 may receive as inputs, signals generated by the weighting and add-back module 511, and the output of which may be communicatively coupled to the multiplier 503B.

The weighting and add-back module 511 may comprise suitable circuitry, logic, interfaces, and/or code that may be operable to receive estimated signals for each of the SF256 OVSF codes that is generated by the Walsh transform module 507, adding to stored signal estimations, and weighted. The outputs of the weighting and add-back module 511 may be communicated to the interference power estimation module 513 and the inverse Walsh transform module 509. The weighting and add-back module 511 may be described further with respect to FIG. 7.

The interference power estimation module 513 may comprise suitable circuitry, logic, interfaces, and/or code that may be operable to estimate OVSF power and signal to noise ratio. The inputs to the interference power estimation module 513 may be communicated from the weighting and add-back module 511 and the outputs may be communicated back to the weighting and add-back module 511 for weighting purposes. The interference power estimation module 513 may be described further with respect to FIG. 8.

In operation, the per-cell module 500 may be operable to process the multipath signal associated with a transmitted 256-chip symbol one at a time. The input to the per-cell module 500 may comprise Cx2 samples from the subtractor residue buffer 405A r(m). The Cx2 samples may be interpolated to Cx8 samples in the cell chip combiner 501 and maximum ratio combined to form a Cx1 output of 256 chips. The Cx1 output may then be descrambled, and communicated to the Walsh transform module 507. The output of the Walsh transform module 507 may represent the estimated signal for each of the SF256 OVSF codes. The estimation may be added to the associated stored signal estimation and weighted. The difference of the newly generated signal estimation and the stored signal estimation may then be communicated to the inverse Walsh transform module 509. The output may then be rescrambled, and used to reconstruct the multipath signal to be subtracted by the subtractor 405, described with respect to FIG. 4.

Figure 6:
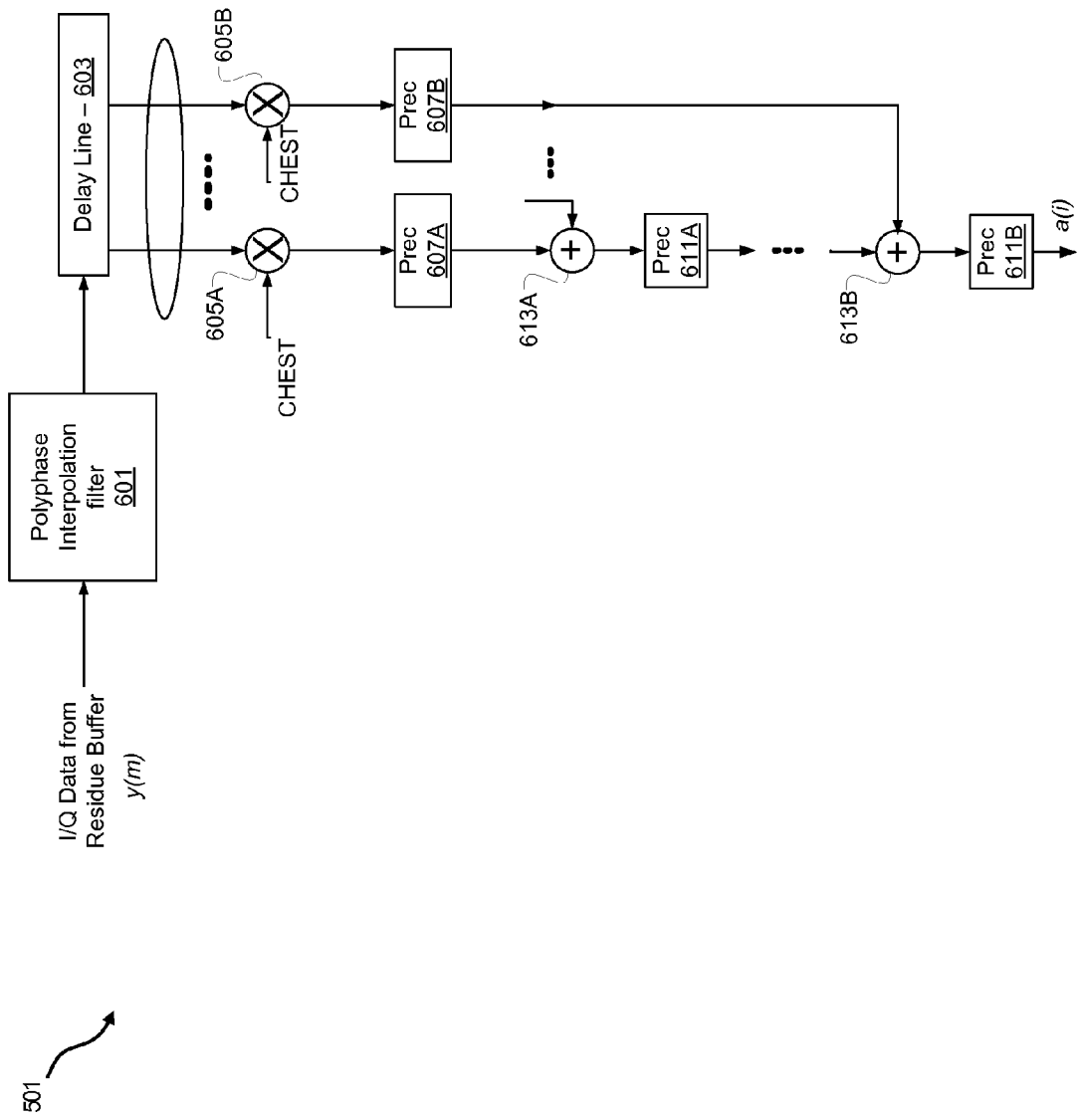
FIG. 6 is a block diagram illustrating an exemplary cell chip combiner, in accordance with an embodiment of the invention.

FIG. 6 is a block diagram illustrating an exemplary cell chip combiner, in accordance with an embodiment of the invention. Referring to FIG. 6, there is shown cell chip combiner 501 comprising a polyphase interpolation filter 601, a delay line 603, multipliers 605A and 605B, precision modules 607A,607B, 611A, and 611B, and adders 613A and 613B.

The polyphase interpolation filter 601 may comprise suitable circuitry, logic, interfaces, and/or code that may be operable to interpolate samples received from the subtractor residue buffer 405A. In an exemplary embodiment, the polyphase interpolation filter 601 may interpolate cx2 samples to cx8 samples.

The delay line 603 may comprise suitable logic, circuitry, logic, and/or code that may be operable to delay received signals. The multipliers 605A and 605B may be substantially similar to the multipliers 503A and 503B and may receive channel estimate information to be multiplied with delayed signals received from the delay line 603.

The precision modules 607A, 607B, 611A, and 611B may comprise suitable circuitry, logic, interfaces, and/or code that may be operable to perform numerical precision adjustments. Numerical precision in the floating and/or fixed point operations used to realize the arithmetic portions of the operations described may be reduced at various points in order to make for a more compact circuit realization and to maintain relative power levels, where appropriate. For example, precision reduction techniques such as rounding, saturation, and truncation may be utilized. Rounding, saturation, and truncation may be used, either separately or in combination, in instances where numerical precisions are to be limited.

Figure 7:
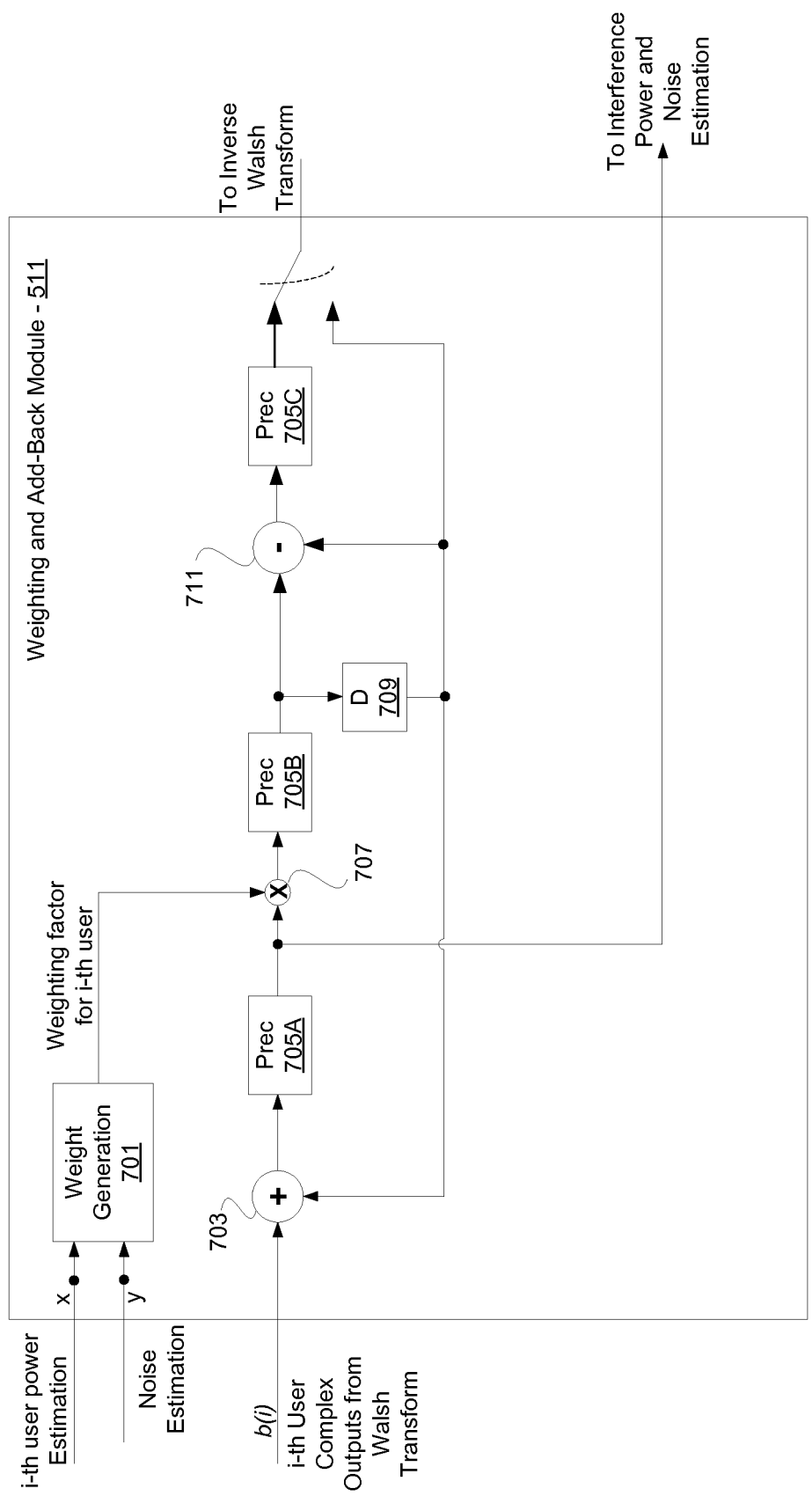
FIG. 7 is a block diagram of an exemplary weighting and add-back module, in accordance with an embodiment of the invention.

FIG. 7 is a block diagram of an exemplary weighting and add-back module, in accordance with an embodiment of the invention. Referring to FIG. 7, there is shown weighting and add-back module 511 comprising a weight generation module 701, an adder 703, precision modules 705A-705C, a multiplier 707, a delay cell 709, and a subtractor 711.

The weight generation module 701 may comprise suitable circuitry, logic, and/or code that may be operable to generate weighting factors for a j-th user from power and noise estimates.

The adder 703 and the subtractor 711 may be substantially similar to the adders 613A and 613B described with respect to FIG. 6, except that the subtractor 711 generates an output that is the difference between the input signals. Similarly, the multiplier 707 and the precision modules 705A-705C may be substantially similar to the multipliers 605A and 605B and the precision modules 607A and 607B described with respect to FIG. 6.

In operation, the weighting and add-back module 511 may receive the input b(i), i=0, 1, . . . , 255. For each index i, the operations may be essentially identical. The weighting and add-back module 511 may utilize the cell index cid and symbol index sid, where sid=1, 2, to initialize the internal state variable g(cid,sid,i), for i=0, 1, ..., 255. At the beginning of the interference cancellation operation, the initialization of the internal state variable may be defined by:

$$g(cid,0,i)=g(cid,1,i)$$

$$g(cid,1,i)=0$$

unless the reset flag is set, as in rst=0.

In instances where rst=0, the initialization of the internal state variable may be defined by the following relationship:

$$g(cid,0,i)=0$$

$$g(cid,1,i)=0$$

The output for the signal and interference power estimation and also for the interference cancellation rake finger and HSDPA output may be represented by the following expression:

$$b'(i)=b(i)+g(cid,sid,i)$$

Below are exemplary fixed point pseudo-codes for the weight generation: Input:

--- x: The signal power estimation <9,9u>
y: The noise estimation <9,9,u>
a: Equal 4λ
b: Equal 4γ
Output:
  z: The calculated weight <3,3,u>
Procedure:
  Ex = x$^2$
  Ey = y$^2$
  If( CPICH noise estimation is used )
    Ex = Ex − Ey;
End

---

Figure 8:
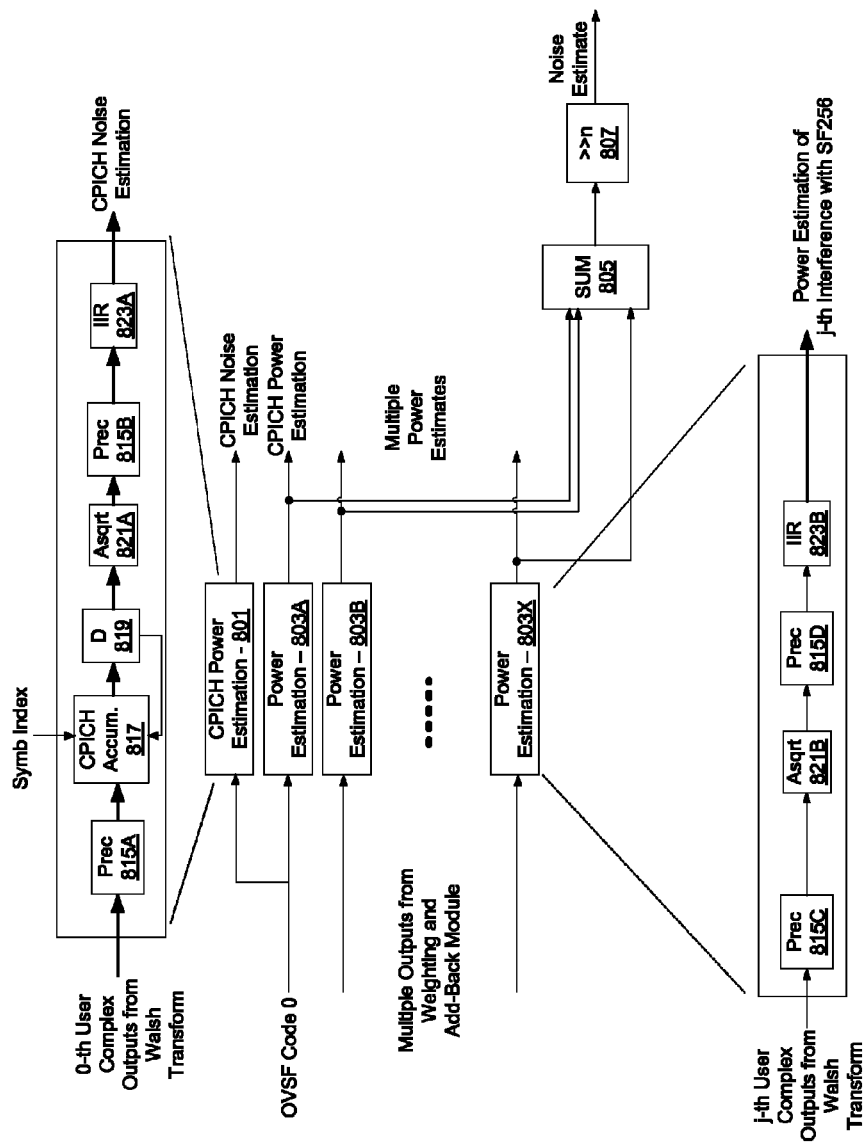
FIG. 8 is a block diagram of an exemplary interference power estimation module, in accordance with an embodiment of the invention.

FIG. 8 is a block diagram of an exemplary interference power estimation module, in accordance with an embodiment of the invention. Referring to FIG. 8, there is shown interference power estimation module 800 comprising CPICH power estimation module 801 and power estimation modules 803A-803X, summing module 805, and a shift module (>>n) 807. The CPICH power estimation module 801 may comprise precision modules 815A and 815B, a CPICH accumulation module 817, a delay module 819, pseudo-square-root (ASQRT) module 821A, and an infinite impulse response (IIR) filter 823A. While it may be advantageous to utilize a true square root function, depending on chip/circuitry area requirements, the ASQRT function may be utilized to reduce the complexity of a square-root calculation, and may be defined by the following relationship:

$$asqrt(x,y)=max(|x|,|y|)+(3/8)*min(|x|,|y|)$$

Similarly, the power estimation modules 803A-803X comprise precision modules 815C and 815D, a ASQRT module 821B, and an IIR filter 823B. The precision modules 815A-815D may be substantially similar to the precision modules 705A-705C described with respect to FIG. 7. The delay module 819 may comprise suitable circuitry, logic, and/or code that may be operable to delay received signals.

The CPICH accumulation module 817 may comprise suitable circuitry, logic, interfaces, and/or code that may be operable to calculate the CPICH variance over a 512 chip period, for example.

The IIR filters 823A and 823B may comprise suitable circuitry, logic, interfaces, and/or code that may be operable to filter unwanted signals from received signals. The IIR filters 823A and 823B may be dynamically configurable and may be tuned via a processor, such as the processor 206.

The interference power estimation module 800 may comprise 256 power estimation modules 803A-803X, for example, but the invention is not so limited. Accordingly, any number of power estimation modules may be utilized depending on the number of OVSF codes utilized in the interference cancellation module 302.

The summing module 805 may comprise suitable circuitry, logic, interfaces, and/or code that may be operable to sum a plurality of power estimates from the power estimation modules 803A-803X before communicating the result to the shift module 807. The shift module 807 may comprise suitable circuitry, logic, interfaces, and/or code that may be operable to perform a fixed point operation comprising a shift of n-bits to the right, where n may equal 16 for example.

In operation, the interference power estimation module 800 may utilize the outputs of the Walsh transform module 507, described with respect to FIG. 5, to estimate the cell OVSF power and noise when the power accumulation flag pa is set. Additionally, the interference power estimation module 800 may calculate the cell CPICH variance following interference cancellation by the interference cancellation module 302. The power and noise estimates may be communicated back to the weighting and add-back module 511.

FIG. 9 is a block diagram illustrating exemplary steps for per-cell interference estimation and cancellation, in accordance with an embodiment of the invention. Referring to FIG. 9, in step 903 after start step 901, the subtractor residue buffer 405A may be initialized, followed by step 905 where the per-cell modules internal state variables may be initialized. In step 907, the channel estimation pre-processing may be executed and may comprise generating parameters to be used in the other modules in the interference cancellation module 302. The pre-processing may also comprise the normalization of the per-cell channel estimation to a constant value, and the generation of the Tx diversity channel weight pre-processing.

In step 909, the symbol boundary, finger delay, and scrambling code phase calculation may be executed. The interference cancellation operation sliding window is 768 chips long, for example. In one cancellation operation, two symbols may be estimated in the per-cell module. The starting scrambling code phases for both estimated symbols may be integer multiples of 256. In an exemplary embodiment, three symbols may have a leading finger starting position that lies in the sliding window of 768 chips long with the first two estimated by the per-cell module.

In step 911, the pa flag may be set to "hold" and the fb_ind may be set to "cancellation iteration" to ensure that during the next iteration, the OVSF power accumulation in the interference power estimation module 513 may not occur and the weighting and add-back module 511 generates a differential signal estimation. The preceding steps comprise initialization steps to be completed before proceeding to iteration steps starting with step 913 where the per-cell module 1 403A may process the received symbol 1, with the results subtracted from the residue buffer 405A.

In step 915, the per-cell module 2 403B may process the received symbol 1, with the results subtracted from the residue buffer 405A, followed by step 917 where the per-cell module 3 403C may process the received symbol 1, with the results subtracted from the residue buffer 405A. In step 919, the per-cell module 4 403D may be operable to process the received symbol 1, with the results subtracted from the residue buffer 405A, followed by step 921 where the per-cell module 1 403A may process the received symbol 2, with the results subtracted from the residue buffer 405A.

In step 923, the per-cell module 2 403B may be operable to process the received symbol 2, with the results subtracted from the residue buffer 405A, followed by step 925 where the per-cell module 1 403A may process the received symbol 2, with the results subtracted from the residue buffer 405A, and step 927 where the per-cell module 2 403B may be operable to process the received symbol 2, with the results subtracted from the residue buffer 405A.

The exemplary steps may then proceed from the iterative steps to the rake and HSDPA output preparation steps, where the per-cell iterations now focuses on the symbols, whose boundary are in the first 256-chip interval of the sliding window, which in many cases means that only symbol 1 may be processed, but in instances where the finger may be drifting backward across the boundary, both symbol 1 and symbol 2 may need to be processed.

Accordingly, in step 929 the pa flag may be set to "accumulate" and fb_ind may be set to "HSDPA output" to enable the OVSF power accumulation in the interference power estimation module 513 and the specified finger output may be generated from the weighting and add-back module 511. This is followed by step 931 where the per-cell module 1 403A may process the received symbol 1, with the results stored in the residue buffer 405A, and step 933 where the per-cell module 2 403B may process the received symbol 1, with the results stored in the subtractor residue buffer 405A. In addition, in steps 931 and 933, the specified finger outputs may be generated for the Cancelling HSDPA Output shown in FIG. 5.

In step 935, the per-cell module 3 403C may process the received symbol 1, with the results stored in the residue buffer 405A, followed by step 937 where the per-cell module 4 403D may process the received symbol 1, with the results stored in the residue buffer 405A. In addition, in steps 935 and 937, the specified finger outputs may be generated for the Cancelling HSDPA Output.

In step 939, the Cancelling HSDPA output from the subtractor 405 may be generated from the residue buffer 405A and specified fingers, followed by end step 941.

In an embodiment of the invention, a method and system are disclosed for per-cell interference estimation for interference suppression. In this regard, a wireless system may receive a plurality of multipath signals 124/128 from a plurality of transmitters 102/104 and allocate each of a plurality of per-cell modules 403A-403D for generating an interference suppressed signal from the plurality of multipath signals 124/128. Each of a plurality of data symbols may be sequentially processed in the received multipath signals 124/128 utilizing the allocated plurality of per-cell modules 403A-403D and subtracting the processed symbols from a residual buffer 405A storing the received multi path signals 124/128. Desired information transmitted by one or more of the plurality of transmitters 102/104 may be recovered utilizing the interference suppressed signal. Timing of the data symbols received from the plurality of transmitters may be correlated utilizing a cell chip combiner 501. The data symbols may be descrambled utilizing conjugated scrambling codes s*(p+i) associated with one of the plurality of transmitters 102/104. A plurality of orthogonal variable spreading factor (OVSF) codes may be generated utilizing a Walsh transform 507 on the plurality of data symbols. Power levels of the OVSF codes may be estimated and estimated signals may be generated based on the OVSF codes and the estimated power levels. A plurality of residual signals may be generated based on a subtractive difference between the plurality of received multipath signals 124/128 and the plurality of estimated signals. A plurality of addback signals may be generated based on an additive sum of the plurality of residual signals and the plurality of estimated signals. A plurality of updated estimated signals may be generated based on the plurality of addback signals and the plurality of weighting factor values. A plurality of incremental signals may be generated based on a subtractive difference between the plurality of updated estimated signals and the plurality of addback signals.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for per-cell interference estimation for interference suppression.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing a multipath signal in a receiver system including one or more processors and/or circuits, the method comprising:
    generating, by the one or more processors and/or circuits, a combined chip-level signal from a plurality of path signals of the multipath signal and corresponding channel estimation parameters;
    processing the combined chip-level signal to generate an interference suppressed symbol-level signal for at least one user;
    generating an interference suppressed chip-level signal for the at least one user from the interference suppressed symbol-level signal and the corresponding channel estimation parameters;
    generating an estimated chip-level signal from the interference suppressed chip-level signal for the at least one user;
    subtracting the estimated chip-level signal from the multipath signal to generate a multipath signal residue; and
    recovering user-specific information from the interference suppressed symbol-level signal for the at least one user and the multipath signal residue.

2. The method according to claim 1, further comprising:
    correlating timing of data symbols received at the receiver system from corresponding sources utilizing a cell chip combiner.

3. The method according to claim 1, wherein the processing of the combined chip-level signal comprises:
    descrambling the combined chip-level signal utilizing scrambling codes associated with a base transceiver station.

4. The method according to claim 3, further comprising:
    generating a plurality of orthogonal variable spreading factor (OVSF) codes utilizing a Walsh transform, and
    wherein the processing of the combined chip-level signal further comprises:
        despreading the combined chip-level signal utilizing the OVSF codes.

5. The method according to claim 4, further comprising: estimating power levels of the OVSF codes.

6. The method according to claim 5, wherein generating the interference suppressed chip-level signal for the at least one user comprises:
    spreading the interference suppressed symbol-level signal for the at least one user utilizing the OVSF codes and the estimated power levels.

7. The method according to claim 6,
    wherein the multipath signal is received by a plurality of antennas of the receiver system,
    wherein the multipath signal residue comprises a plurality of residual signals associated with the plurality of antennas, and
    wherein the subtracting comprises:
        subtracting an estimated chip-level signal associated with an antenna of the plurality of antennas from a corresponding path signal of the multipath signal.

8. The method according to claim 1, further comprising:
    processing the multipath signal residue to generate a symbol-level signal residue for the at least one user; and
    generating a plurality of addback data symbols for the at least one user from an additive sum of the symbol-level signal residue for the at least one user and a corresponding interference suppressed symbol-level signal.

9. The method according to claim 8, further comprising:
    generating an updated interference suppressed symbol-level signal for the at least one user from the plurality of addback data symbols and a plurality of weighting factor values.

10. The method according to claim 9, further comprising:
    generating an incremental signal for the at least one user from a subtractive difference between the updated interference suppressed symbol-level signal for the at least one user and the plurality of addback data symbols for the at least one user.

11. A system for wireless communication, the system comprising:
    one or more antennas configured to receive a multipath signal; and
    one or more processors and/or circuits for use in a wireless communication system, the one or more processors and/or circuits being configured to:
        generate a combined chip-level signal from a plurality of path signals of the multipath signal and corresponding channel estimation parameters;
        process the combined chip-level signal to generate an interference suppressed symbol-level signal for at least one user;
        generate an interference suppressed chip-level signal for the at least one user from the interference suppressed symbol-level signal and the corresponding channel estimation parameters;
        generate an estimated chip-level signal from the interference suppressed chip-level signal for the at least one user;
        subtract the estimated chip-level signal from the multipath-signal to generate a multipath signal residue; and
        recover user-specific information from the interference suppressed symbol-level signal for the at least one user and the multipath signal residue.

12. The system according to claim 11, wherein the one or more processors and/or circuits are further configured to correlate timing of data symbols received from corresponding sources utilizing a cell chip combiner.

13. The system according to claim 11, wherein the one or more processors and/or circuits are further configured to descramble the combined chip-level signal utilizing scrambling codes associated with a base transceiver station.

14. The system according to claim 13, wherein the one or more processors and/or circuits are further configured to:
    generate a plurality of orthogonal variable spreading factor (OVSF) codes utilizing a Walsh transform; and
    despread the combined chip-level signal utilizing the OVSF codes to generate the interference suppressed symbol-level signal.

15. The system according to claim 14, wherein the one or more processors and/or circuits are configured to estimate power levels of the OVSF codes.

16. The system according to claim 15, wherein the one or more processors and/or circuits are further configured to generate the interference suppressed chip-level signal for the at least one user by spreading the interference suppressed symbol-level signal for the at least one user utilizing the OVSF codes and the estimated power levels.

17. The system according to claim 16, wherein the multipath signal residue comprises a plurality of residual signals associated with the one or more antennas, and
    wherein the one or more processors and/or circuits are configured to calculate the multipath signal residue by subtracting an estimated chip-level signal associated with an antenna of the one or more antennas from a corresponding path signal of the multipath signal.

18. The system according to claim 11, wherein the one or more processors and/or circuits are configured to:
process the multipath signal residue to generate a symbol-level signal residue for the at least one user; and
generate a plurality of addback data symbols for the at least one user from an additive sum of the symbol-level signal residue for the at least one user and a corresponding interference suppressed symbol-level signal.

19. The system according to claim 18, wherein the one or more processors and/or circuits are configured to generate an updated interference suppressed symbol-level signal for the at least one user from the plurality of addback data symbols and a plurality of weighting factor values.

20. The system according to claim 19, wherein the one or more processors and/or circuits are configured to generate an incremental signal for the at least one user from a subtractive difference between the interference suppressed symbol-level signal for the at least one user and the plurality of addback data symbols for the at least one user.

* * * * *